US012230433B2

(12) United States Patent
Ojima

(10) Patent No.: US 12,230,433 B2
(45) Date of Patent: Feb. 18, 2025

(54) COIL COMPONENT AND METHOD OF MANUFACTURING THE SAME

(71) Applicant: Murata Manufacturing Co., Ltd., Kyoto-fu (JP)

(72) Inventor: Nobuyuki Ojima, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 666 days.

(21) Appl. No.: 17/473,918

(22) Filed: Sep. 13, 2021

(65) Prior Publication Data

US 2022/0084739 A1 Mar. 17, 2022

(30) Foreign Application Priority Data

Sep. 14, 2020 (JP) ................................ 2020-153931

(51) Int. Cl.

| | |
|---|---|
| ***H01F 27/28*** | (2006.01) |
| ***H01F 27/29*** | (2006.01) |
| ***H01F 41/066*** | (2016.01) |
| ***H01F 41/076*** | (2016.01) |
| *H01F 5/06* | (2006.01) |

(52) U.S. Cl.

CPC ....... *H01F 27/2828* (2013.01); *H01F 27/292* (2013.01); *H01F 41/066* (2016.01); *H01F 41/076* (2016.01); *H01F 5/06* (2013.01)

(58) Field of Classification Search

CPC ...... H01F 27/2828; H01F 27/292; H01F 5/06; H01F 17/045; H01F 41/10; H01F 5/00; H01F 41/04

USPC ........................................... 336/221, 180, 83

See application file for complete search history.

(56) References Cited

U.S. PATENT DOCUMENTS

| | | | | |
|---|---|---|---|---|
| 6,535,095 B2 * | 3/2003 | Aoki | H01F 27/027 | 336/200 |
| 2003/0071704 A1 * | 4/2003 | Toi | H01F 27/36 | 336/83 |
| 2006/0071749 A1 * | 4/2006 | Aoki | H01F 17/045 | 336/83 |
| 2006/0267719 A1 * | 11/2006 | Yasuda | H01F 17/045 | 336/223 |
| 2008/0003864 A1 * | 1/2008 | Hatakeyama | H01F 17/045 | 439/399 |
| 2016/0118183 A1 * | 4/2016 | Wada | H01F 27/292 | 336/192 |

FOREIGN PATENT DOCUMENTS

| | | | |
|---|---|---|---|
| CN | 110534319 A | | 12/2019 |
| JP | H11-283857 A | | 10/1999 |
| JP | 2005-310982 A | | 11/2005 |
| JP | 2006286807 A | * | 10/2006 |
| JP | 2015-050373 A | | 3/2015 |

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

A coil component includes: a core that includes a winding-core portion and a flange portion that is formed on an end surface of the winding-core portion; a wire that is wound around the winding-core portion; and an outer electrode that is formed on a bottom surface of the flange portion, to which an end portion of the wire is connected, and that includes a first metal layer that forms a surface of the outer electrode. At least a part of the end portion of the wire is embedded in the first metal layer.

13 Claims, 5 Drawing Sheets

COIL COMPONENT AND METHOD OF MANUFACTURING THE SAME

CROSS-REFERENCE TO RELATED APPLICATION

This application claims benefit of priority to Japanese Patent Application No. 2020-153931, filed Sep. 14, 2020, the entire content of which is incorporated herein by reference.

BACKGROUND

Technical Field

The present disclosure relates to a coil component and a method of manufacturing a coil component.

Background Art

Japanese Unexamined Patent Application Publication No. 2015-50373 describes an example of an existing wire-wound coil component. The coil component includes a core that includes a winding-core portion and a flange portion that is formed on each of two end portions of the winding-core portion, a wire that is wound around the winding-core portion, and an outer electrode that is formed on a bottom surface of the flange portion and to which an end portion of the wire is connected.

SUMMARY

However, in the existing coil component, the end portion of the wire is disposed on a surface of the outer electrode and is exposed. Therefore, the end portion of the wire is attached to the outer electrode comparatively loosely, the wire may become detached from the outer electrode, and the closeness of connection between the end portion of the wire and the outer electrode may decrease.

Accordingly, the present disclosure provides a coil component in which an end portion of a wire is firmly connected to an outer electrode. The present disclosure also provides a method of manufacturing such a coil component.

According to preferred embodiments of the present disclosure, a coil component includes: a core that includes a winding-core portion and a flange portion that is formed on an end surface of the winding-core portion; a wire that is wound around the winding-core portion; and an outer electrode that is formed on a bottom surface of the flange portion, to which an end portion of the wire is connected, and that includes a first metal layer that forms a surface of the outer electrode. At least a part of the end portion of the wire is embedded in the first metal layer.

With the preferred embodiments, at least a part of the end portion of the wire is embedded in the first metal layer. Thus, the area of contact between the end portion of the wire and the outer electrode is comparatively large, and it is possible to firmly connect the end portion of the wire to the outer electrode.

According to preferred embodiments of the present disclosure, a method of manufacturing a coil component includes: preparing a core that includes a winding-core portion and a flange portion that is formed on an end surface of the winding-core portion; forming an outer electrode on a bottom surface of the flange portion; winding a wire around the winding-core portion; and heat-connecting an end portion of the wire to the outer electrode. When forming the outer electrode, a first metal layer is formed by plating so as to form a surface of the outer electrode. Before heat-connecting the wire, a flux that includes rosin and an activator is applied to the first metal layer or the end portion of the wire. When heat-connecting the wire, the end portion of the wire is heated while sequentially stacking the first metal layer, the flux, and the end portion of the wire, and thereby the flux removes an oxide film on a surface of the first metal layer.

With the preferred embodiments, because the activator, which is included in the flux, removes the oxide film on the surface of the first metal layer, the first metal layer easily melts, and at least a part of the end portion of the wire is embedded in the first metal layer. Thus, the area of contact between the end portion of the wire and the outer electrode is comparatively large, and it is possible to firmly connect the end portion of the wire to the outer electrode.

With the present disclosure, it is possible to provide a coil component in which an end portion of a wire is firmly connected to the outer electrode. Moreover, with the present disclosure, it is possible to provide a method of manufacturing such a coil component.

Other features, elements, characteristics and advantages of the present disclosure will become more apparent from the following detailed description of preferred embodiments of the present disclosure with reference to the attached drawings.

DETAILED DESCRIPTION

Figure 1:
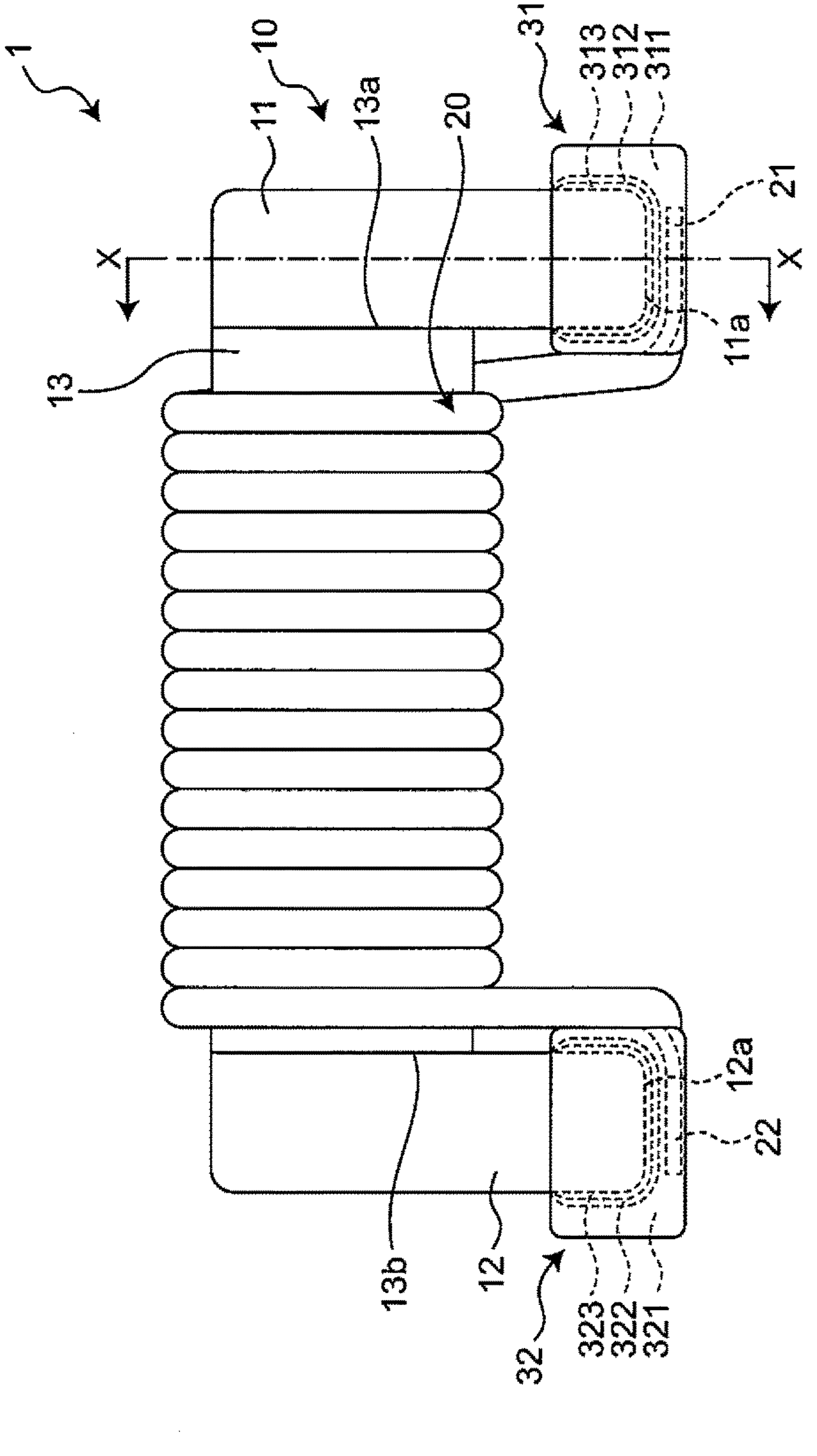
FIG. 1 is a side view of a coil component according to a first embodiment.

Hereafter, a coil component and a method of manufacturing the coil component, each according to an aspect of the present disclosure, will be described in detail by using embodiments illustrated in the drawings. Some of the drawings include schematic views and may not reflect actual dimensions and proportions.

First Embodiment

Configurations

Figure 2:
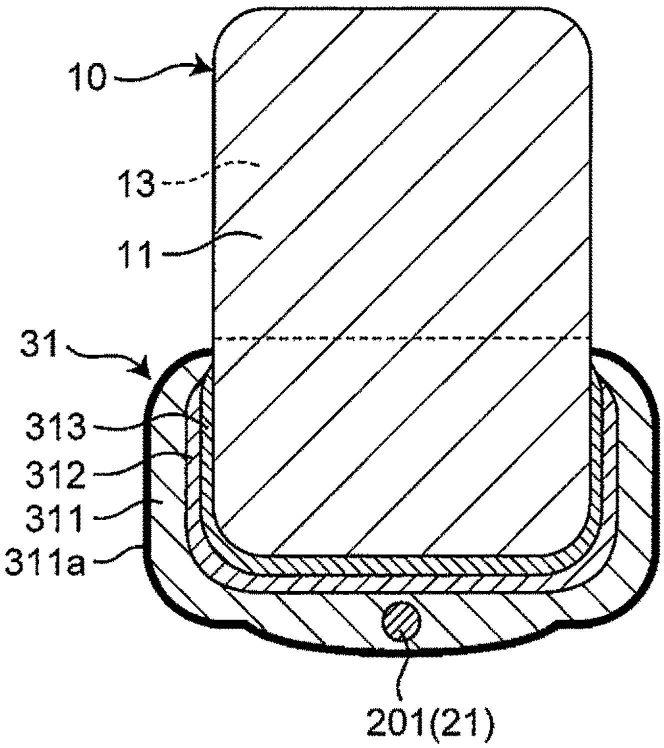
FIG. 2 is a sectional view of the coil component according to the first embodiment.
Figure 3:
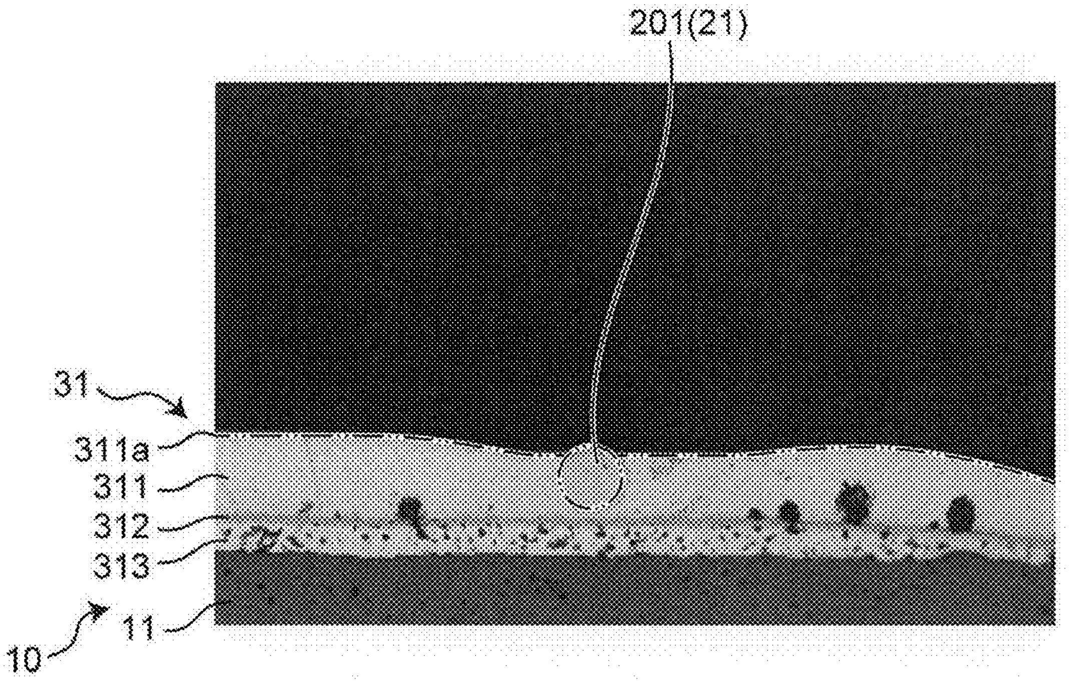
FIG. 3 is a sectional view of a coil component according to an Example.

FIG. 1 is a side view of a coil component 1 according to a first embodiment of the present disclosure. FIG. 2 is a sectional view of the coil component 1 according to the first embodiment. FIG. 2 illustrates a section taken along line X-X in FIG. 1. FIG. 3 illustrates a section of a first end portion 21 of a wire 20. Referring to FIGS. 1 to 3, the coil component 1 will be described.

The coil component 1 includes: a core 10; the wire 20 wound around the core 10; and a first electrode 31 and a second electrode 32 that are disposed on the core 10, that are electrically connected to the wire 20, and that are outer electrodes.

The core 10 includes: a winding-core portion 13 that has a shape extending in a certain direction and around which the wire 20 is wound; a first flange portion 11 that is formed at a first end 13*a* of the winding-core portion 13 in the direction in which the winding-core portion 13 extends and that protrudes in a direction perpendicular to the direction; and a second flange portion 12 that is formed at a second end 13*b* of the winding-core portion 13 in the direction in which the winding-core portion 13 extends and that protrudes in a direction perpendicular to the direction. The material of the core 10 is preferably a magnetic material, such as a sintered compact of ferrite or a molded compact of magnetic-powder-containing resin. Alternatively, the material may be a non-magnetic material, such as alumina or a resin. Hereafter, it will be assumed that the bottom surface of the core 10 is a surface to be mounted on a circuit board.

The first flange portion 11 has a first bottom surface 11*a* on a side to be mounted on a circuit board. The second flange portion 12 has a second bottom surface 12*a* on the side to be mounted on the circuit board.

The wire 20 is wound around the winding-core portion 13. The first end portion 21 of the wire 20 is connected to the first electrode 31, and a second end portion 22 of the wire 20 is connected to the second electrode 32. The winding axis (coil axis) of the wire 20 coincides with the direction in which the winding-core portion 13 extends. The wire 20 includes a conductive portion 201 and a covering portion 202 that covers the conductive portion 201. The conductive portion 201 is made of, for example, copper. The material of the covering portion 202 is preferably a urethane-based resin or an imide-based resin, such as polyurethane or polyamide-imide, or may be a mixture of these. In particular, the covering portion 202 made of a resin having high heat resistance, such as a polyamide-imide, does not easily vanish in a heat-pressure-bonding step, and there may be a case where the resin remains as a residue and may cause a failure in pressure-bonding. In such a case, combination with application of flux in a manufacturing method described below is particularly effective.

The first end portion 21 of the wire 20 is entirely embedded in the first electrode 31. When at least a part of the first end portion 21 of the wire 20 is embedded in the first electrode 31, the area of contact between the first end portion 21 of the wire 20 and the first electrode 31 is comparatively large. Thus, it is possible to firmly connect the first electrode 31 and the wire 20. Moreover, because the first end portion 21 of the wire 20 is embedded in the first electrode 31, when mounting the coil component 1 on a circuit board, the first end portion 21 of the wire 20 does not easily become detached from the first electrode 31. Therefore, the first electrode 31 and the wire 20 can be firmly connected to each other, also after the coil component 1 has been mounted.

Moreover, the area of the first end portion 21 of the wire 20 that is exposed on the surface of the first electrode 31 is small. The exposed part of the first end portion 21 of the wire 20 usually has low wettability, compared with the surface of the first electrode 31. Thus, because the exposed area of the first end portion 21 having low wettability is small, the first electrode 31 of the coil component 1 has high wettability and can be strongly joined to a circuit board.

With existing technology, it is not possible to sufficiently embed the first end portion 21 of the wire 20 in the first electrode 31, and the first end portion 21 of the wire 20 is disposed on the surface of the first electrode 31 and is exposed. The inventors have investigated for the reason why the first end portion 21 is not sufficiently embedded in the first end portion 21 and found that there are mainly two reasons: a first plating layer 311 does not easily melt when heated, because a metal oxide film 311*a* is formed on the surface of the first plating layer 311; and the covering portion 202 of the wire 20 is repellent to a melted material (such as Sn) of the first plating layer 311.

The inventors have examined further and found the following facts: a flux 40 has a function of removing the metal oxide film 311*a* (usually, a metal oxide film whose melting point is high); and the flux 40 additionally has a function of, for example, thermally decomposing a resin, which is the material of the covering portion 202, at a temperature that is lower than the highest allowable temperature of the resin. Based on this technological finding, the inventors have deduced the ability of the flux 40 in that "the flux 40 removes the covering portion 202" due to a function characteristic to the flux 40. As a result of the careful examination, the inventors have conceived of an idea that "at least a part of the first end portion 21 of the wire 20 is embedded in the first plating layer 311", which is the feature of the present disclosure.

In a cross section of the wire 20 (section taken along line X-X in FIG. 1), the shape (sectional shape) of the conductive portion 201 in the first end portion 21 of the wire 20 is substantially the same as the shape of the conductive portion 201 of the wire 20 that is positioned on the winding-core portion 13. In the present specification, the term "cross section" refers to a section that is perpendicular to the direction in which the wire 20 extends. To be specific, the sectional shape of the conductive portion 201 in the first end portion 21 of the wire 20 is substantially circular. In an existing pressure-bonding process, a wire usually collapses as a large pressing force is applied to the wire. Thus, the sectional shape of a conductive portion in an end portion of the wire is, for example, a flat shape that does not maintain the original shape. In contrast, with the present embodiment, for example, as described in a manufacturing method described below, it is possible to connect the first end portion 21 of the wire 20 to the first electrode 31 without requiring a large pressing force in a pressure-bonding process. That is, because the sectional shape of the conductive portion 201 in the first end portion 21 of the wire 20 maintains the original shape, damage to the coil component 1 is small. Therefore, it is possible to reduce the risk of breaking of the wire 20 and to suppress generation of a crack in the core 10 and the first electrode 31.

In the first end portion 21 of the wire 20, the conductive portion 201 is exposed from the covering portion 202 in a part adjacent to the first bottom surface 11*a* of the first flange portion 11. To be more specific, the area over which the conductive portion 201 is exposed in the first end portion 21 of the wire 20 is larger in a part adjacent to the first bottom surface 11*a* of the first flange portion 11 than in a part adjacent to the surface of the outer electrode (the first electrode 31) (not shown in FIG. 2). Usually, the covering portion 202 is made of an insulating material, and the first electrode 31 and the conductive portion 201 are each made of a metal. The connectivity between metals is high, compared with the connectivity between an insulating material and a metal. Therefore, when the conductive portion 201 is exposed from the covering portion 202 in the first end portion 21 of the wire 20, the conductive portion 201 and the first electrode 31 are firmly connected to each other in the first end portion 21 of the wire 20. Thus, it is possible to improve the strength of joint when the coil component 1 is mounted.

In the first end portion 21 of the wire 20, the area over which the conductive portion 201 is exposed is larger in a part adjacent to the bottom surface of the first flange portion 11 than in a part adjacent to the surface of the first electrode 31. The reason for this is that the covering portion 202 in a part adjacent to the first bottom surface 11*a* is removed easily, as described below. In a pressure-bonding process of the manufacturing method described below, the covering portion 202 of the first end portion 21 of the wire 20, which exits at the time of the pressure-bonding process, and the first plating layer 311 are pressure-bonded to each other in a state of being in contact with a flux. To be more specific, in heat-connecting the wire 20, the first end portion 21 of the wire 20 is heated while sequentially stacking the first plating layer 311, the flux 40, and the first end portion 21 of the wire 20. When heated, the flux 40 decomposes the covering portion 202. Therefore, in the first end portion 21 of the wire 20, a part of the covering portion 202 adjacent to the first bottom surface 11*a* of the first flange portion 11 is preferentially decomposed compared with a part of the covering portion 202 adjacent to the surface of the first electrode 31. Therefore, the covering portion 202 of the first end portion 21 is removed at a low temperature (such as a temperature in the range of 200° C. to 300° C.) and at a low pressure or no pressure compared with heat-pressure-bonding that does not use the flux 40, and it is possible to embed the first end portion 21 of the wire 20 in the first electrode 31.

In contrast, with existing heat-pressure-bonding that does not use the flux 40, a part of the covering portion 202 of the first end portion 21 of the wire 20 is heated from a part adjacent to the surface of the first electrode 31. Therefore, the covering portion 202 in a part adjacent to the surface of the first electrode 31 is preferentially decomposed. It may occur that the area over which the conductive portion 201 is exposed is smaller in a part adjacent to the first bottom surface 11*a* of the first flange portion 11 than in a part adjacent to the surface of the first electrode 31.

As described above, because the flux 40 decomposes the covering portion 202, it is possible to remove the covering portion 202 and to expose the conductive portion 201, even if the covering portion 202 of the wire 20 is made of a material having particularly high heat resistance (to be more specific, polyamide-imide or the like). In contrast, with existing heat-pressure-bonding that does not use the flux 40, it is not possible to sufficiently remove the covering portion 202 having high heat resistance, and it is necessary to additionally perform a step of laser irradiation or the like.

As described above, in the first end portion 21 of the wire 20, the conductive portion 201 is exposed from the covering portion 202 at least in a part adjacent to the first bottom surface 11*a* of the first flange portion 11. Preferably, the first end portion 21 of the wire 20 does not include the covering portion 202, in view of further improving the strength of joint when the coil component 1 is mounted. This is because, if the first end portion 21 of the wire 20 does not include the covering portion 202, the exposed area of the conductive portion 201 in the first end portion 21 becomes larger, and the area of contact with the first electrode 31 increases.

As describe above, the conductive portion 201 is exposed from the covering portion 202 in a part adjacent to the first bottom surface 11*a* of the first flange portion 11, and the area over which the conductive portion 201 is exposed in the first end portion 21 of the wire 20 is larger in a part adjacent to the first bottom surface 11*a* of the first flange portion 11 than in a part adjacent to the surface of the first electrode 31. These facts can be confirmed by using the following method. The coil component 1 is cut at the center of the first electrode 31 as illustrated in FIG. 1 to form a section (section taken along line X-X). By using a scanning electron microscope (SEM) and energy-dispersive X-ray spectroscopy (EDX), a signal that derives from a material of the covering portion 202 is measured about the section that has been formed. A mapping process is performed on an image of the section based on the measurement result to form an analysis image that represents the distribution of the material. A part of the analysis image near the wire 20 (to be more specific, near the surface of the conductive portion 201) is observed. During the observation, it is possible to confirm that the covering portion 202 is not present in the first end portion 21, based on the mapping position and the abundance of carbon (C).

The first electrode 31 is disposed on the first bottom surface 11*a* of the first flange portion 11. The first electrode 31 includes an underlying electrode layer 313 formed on the first bottom surface 11*a* of the first flange portion 11, a second plating layer 312 formed on the underlying electrode layer 313, and the first plating layer 311 formed on the second plating layer 312. The first plating layer 311 forms a surface of the first electrode 31. The first plating layer 311 includes the metal oxide film 311*a*. The metal oxide film 311*a* is provided on the surface of the first plating layer 311. The metal oxide film 311*a* may be present on a part of the surface of the first plating layer 311 or may be present on the entirety of the surface. The metal oxide film 311*a* is formed by oxidizing a surface part of the first plating layer 311. To be more specific, the metal oxide film 311*a* includes: an oxide film that is formed after the first plating layer 311 has been formed in an outer-electrode forming step described below; and an oxide film that is in a surface part of the first plating layer 311 and that is formed again when connecting the first end portion 21 of the wire 20 and the first electrode 31 in the connection step. That is, the latter oxide film is formed when an oxide film (a part of the former oxide film) that has been once reduced by the flux 40 (an activator) during heat-connection is oxidized again in a surface part of the first plating layer 311 that is newly formed after connection (after embedding of the wire 20).

The first plating layer 311 is, for example, a metal layer that is formed by plating. The first plating layer 311 includes, for example, tin. To be more specific, the first plating layer 311 is a Sn (tin) layer or a tin alloy layer, each of which has high wettability. The metal oxide film 311*a* is a film that is formed when the surface of the first plating layer 311 is oxidized by oxygen in the atmosphere. The material of the metal oxide film 311*a* is, for example, tin oxide.

The first plating layer 311 includes carbon in a case where, for example, the coil component 1 is made by using the manufacturing method described below. It is possible to confirm that carbon is present in the first plating layer 311 by using the following method. The coil component 1 is cut at the center of the first electrode 31 as illustrated in FIG. 1 to form a section (section taken along line X-X). By using a SEM and EDX, a signal that derives from carbon is measured about the section that has been formed. A mapping process is performed on an image of the section based on the measurement result to form an analysis image that represents the distribution of carbon. The first plating layer 311 in the analysis image is observed. By doing so, it is possible to confirm that carbon in present the first plating layer 311. At this time, by using Fourier transform infrared spectroscopy (FT-IR), whether the carbon is a part of a resin and whether the resin is a residue that derives from a content of the flux 40 (to be more specific, that the resin includes rosin or a modified rosin) may be checked.

The second plating layer 312 is a metal layer that is formed by plating. The second plating layer 312 is made of, for example, Ni, and is a Ni layer that has resistance to solder leaching (barrier layer).

The second plating layer 312 is not in contact with the first end portion 21 of the wire 20.

The underlying electrode layer 313 is, for example, a sintered layer that is formed by sintering a conductive paste, such as a Ag glass paste, applied by using a dip method. When the underlying electrode layer 313 is a sintered layer, the underlying electrode layer 313 can have sufficient strength and anti-shock ability, and the underlying electrode layer 313 can be securely fixed to the first flange portion 11. The underlying electrode layer 313 is, for example, a Ag layer having low electrical resistance.

Example

FIG. 3 illustrates a section of a coil component 1 according to Example. FIG. 3 corresponds to an enlarged sectional view of the first end portion 21 of the wire 20 of FIG. 2 (note that FIG. 3 is turned upside down relative to FIG. 2). The first electrode 31 included: the underlying electrode layer 313 formed on the first flange portion 11 and including Ag; the second plating layer 312 formed on the underlying electrode layer 313 and made of Ni; and the first plating layer 311 formed on the second plating layer 312 and made of Sn. The metal oxide film 311*a* was present on the surface of the first plating layer 311. The wire 20 included the conductive portion 201 made of Cu and the covering portion 202 covering the conductive portion 201 and made of polyurethane.

A part of the first end portion 21 of the wire 20 was embedded in the first electrode 31 (to be specific, the first plating layer 311) and was not in contact with the second plating layer 312. The sectional shape of the conductive portion 201 in the first end portion 21 of the wire 20 was substantially circular, and was substantially the same as the sectional shape of the conductive portion 201 of the wire 20 that was positioned on the winding-core portion 13. It was confirmed by using EDX that the first end portion 21 of the wire 20 did not include the covering portion 202 and included only the conductive portion 201. By using EDX, it was confirmed that carbon was present in the first plating layer 311. It is estimated that the carbon was a residue that derived from a content of the flux 40 used for manufacturing. The flux 40 used for manufacturing the coil component 1 included rosin, a solvent, and an activator. In the Example, a part of the first end portion 21 of the wire 20 was embedded in the first electrode 31. However, in some other Examples, the first end portion 21 of the wire 20 was entirely embedded in the first electrode 31.

Method of Manufacturing Coil Component

Figure 4A:
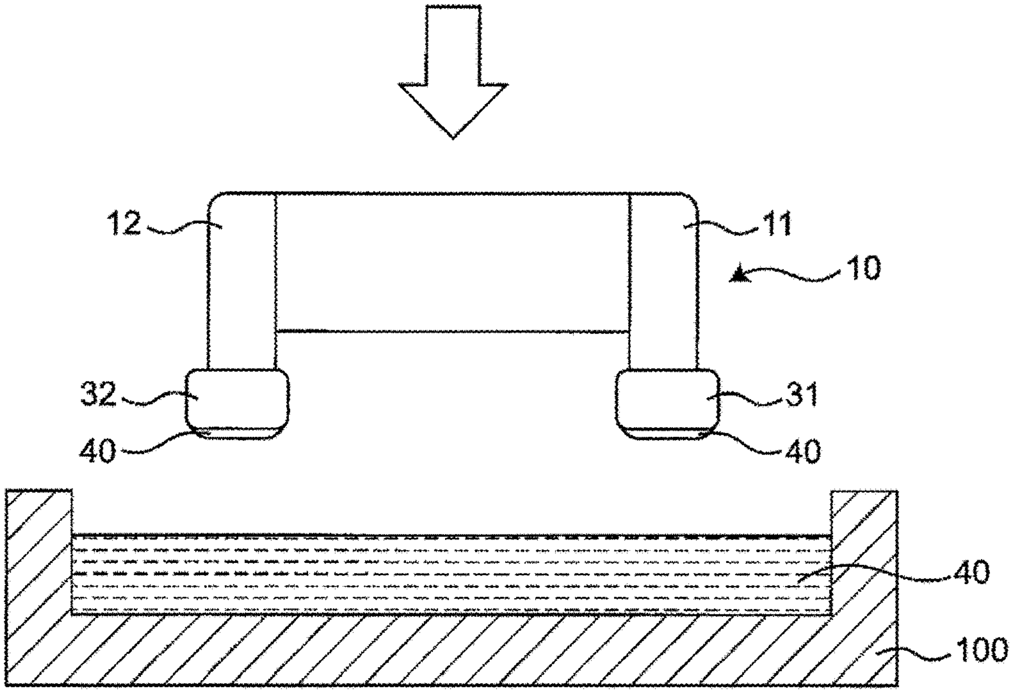
FIG. 4A is a sectional view illustrating a method of manufacturing a coil component according to a second embodiment.
Figure 4B:
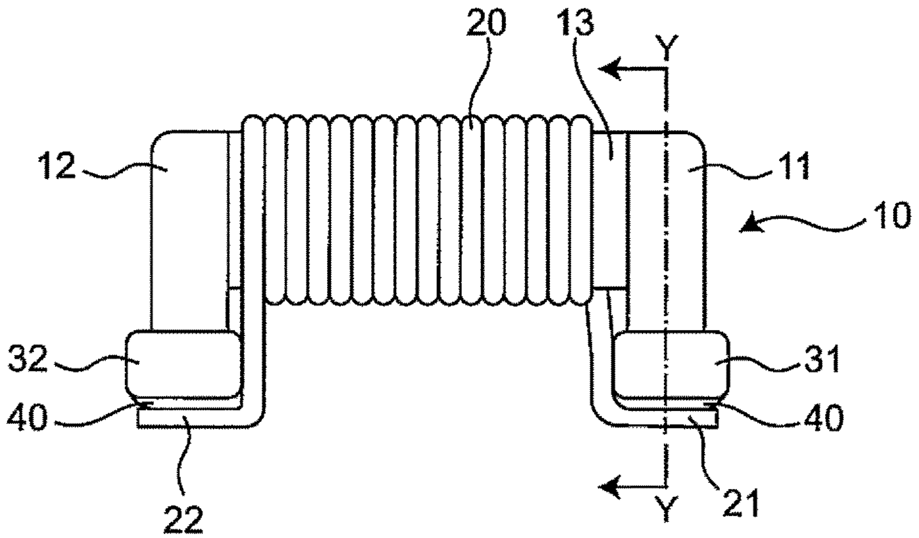
FIG. 4B is a side view illustrating the method of manufacturing the coil component according to the second embodiment.
Figure 4C:
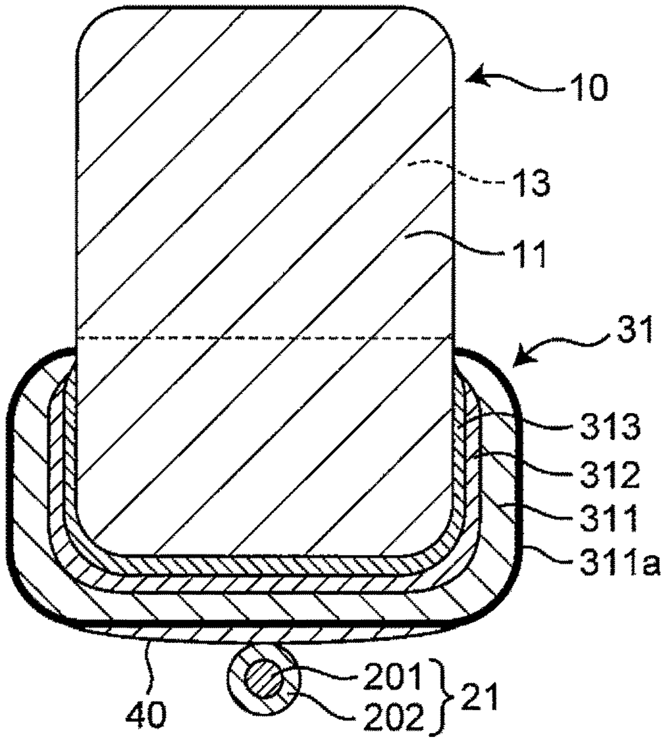
FIG. 4C is a sectional view illustrating the method of manufacturing the coil component according to the second embodiment.

Referring to FIGS. 4A to 4D, an example of a method of manufacturing the coil component 1 will be described. FIGS. 4A to 4D are side views and sectional views illustrating the method of manufacturing the coil component 1. FIG. 4C illustrates a section taken along line Y-Y in FIG. 4B.

The method of manufacturing the coil component 1 includes a core preparing step, an outer-electrode forming step, a flux applying step, a wire winding step, and a connection step. To be more specific, the method of manufacturing a coil component includes: preparing the core 10 that includes the winding-core portion 13 and the first and second flange portions 11 and 12 that are formed on end surfaces of the winding-core portion 13 (core preparing step); forming outer electrodes (the first and second electrodes 31 and 32) on the first and second bottom surfaces 11*a* and 12*a* of the first and second flange portions 11 and 12 (outer-electrode forming step); winding the wire 20 around the winding-core portion 13 (wire winding step); and heat-connecting the first and second end portions 21 and 22 of the wire 20 to the first and second electrodes 31 and 32 (connection step). When forming the first and second electrodes 31 and 32, first metal layers (the first plating layers 311 and 321) are formed by plating so as to form surfaces of the first and second electrodes 31 and 32. Before heat-connecting the wire 20, the flux 40 that includes rosin and an activator is applied to the first plating layers 311 and 321 or the first and second end portions 21 and 22 of the wire 20 (flux applying step). When heat-connecting the wire 20, the first and second end portions 21 and 22 of the wire 20 are heated while sequentially stacking the first plating layers 311 and 321, the flux, and the first and second end portions 21 and 22 of the wire 20, and thereby the flux 40 removes the metal oxide films 311*a* on the surfaces of the first plating layers 311 and 321.

In the core preparing step, the core 10 is prepared. For example, the core 10 is integrally formed by using a mold. By doing so, it is possible to prepare the core 10 that includes the winding-core portion 13, the first flange portion 11 formed on the first end 13*a* of the winding-core portion 13, and the second flange portion 12 formed on the second end 13*b* of the winding-core portion 13.

In the outer-electrode forming step, the first and second electrodes 31 and 32 are formed on the first and second bottom surfaces 11*a* and 12*a* of the first and second flange portions 11 and 12. When forming the first and second electrodes 31 and 32, the first plating layers 311 and 321 are formed so as to form the surfaces of the first and second electrodes 31 and 32. To be more specific, in the outer-electrode forming step, the underlying electrode layer 313, the second plating layer 312, and the first plating layer 311 are sequentially formed on the first bottom surface 11*a* of the first flange portion 11. The underlying electrode layer 313 is formed, for example, by applying a conductive paste to the first bottom surface 11*a* of the first flange portion 11 by using a dip method and by sintering the applied film. The conductive paste includes, for example, glass and conductive powder. The conductive powder is, for example, Ag powder. Next, the second plating layer 312 is formed, for example, by Ni plating. The first plating layer 311 is formed, for example, by Sn plating. The metal oxide film 311*a* is formed because, for example, after Sn plating, a surface part of the first plating layer 311 reacts with oxygen included in the atmosphere. Moreover, in the final product of the coil component 1, the metal oxide film 311*a* includes, in addition to the oxide film formed after Sn plating, an oxide film formed after heat-connection described below. The latter metal oxide film 311*a* is formed in the connection step because, for example, a surface part of the first plating layer 311, which has been formed again when connecting the first end portion 21 of the wire 20 and the first electrode 31, is oxidized. In FIG. 4C, which illustrates a state immediately after heat-connection, the metal oxide film 311*a* has not been formed in the surface part of the first plating layer 311 that has been formed again.

In the flux applying step, before heat-connecting the wire 20, as illustrated in FIG. 4A, the flux 40, which includes rosin and an activator, is applied to the first plating layer 311

(the metal oxide film 311*a*). To be specific, the core 10 is bathed in the flux 40 in a container 100 so that the flux 40 is applied to the first electrode 31 provided on the first bottom surface 11*a* of the core 10.

In the wire winding step, the wire 20 is wound around the winding-core portion 13.

In the connection step, the first and second end portions 21 and 22 of the wire 20 are heat-connected to the first and second electrodes 31 and 32. To be more specific, when heat-connecting the wire 20 in the connection step, the first end portion 21 of the wire 20 is heated while sequentially stacking the first plating layer 311, the flux 40, and the first end portion 21 of the wire 20, and thereby the flux 40 removes the metal oxide film 311*a* on the surface of the first plating layer 311.

To be specific, in the connection step, first, as illustrated in FIGS. 4B and 4C, the first end portion 21 of the wire 20 is placed on the surface of the first plating layer 311 so that the flux 40 is interposed between the surface of the first plating layer 311 and the first end portion 21 of the wire 20. To be specific, the first end portion 21 of the wire 20 is bent to come into contact with the applied film of the flux 40, which has been formed on the first plating layer 311. Thus, the first plating layer 311 and the first end portion 21 of the wire 20 are brought into contact with the flux 40. In the present specification, the expression "the first plating layer 311 and the first end portion 21 of the wire 20 are brought into contact with the flux 40" includes the meaning that the metal oxide film 311*a* and the first end portion 21 of the wire 20 are brought into contact with the flux 40.

Figure 4D:
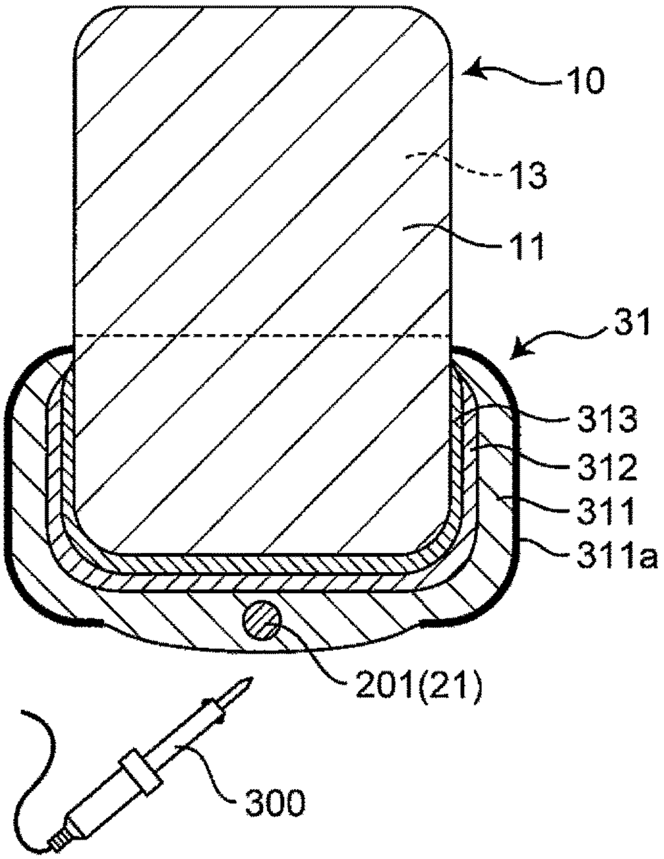
FIG. 4D is a sectional view illustrating the method of manufacturing the coil component according to the second embodiment.

In the connection step, next, as illustrated in FIGS. 4C and 4D, the wire 20 is heated to embed at least a part of the first end portion 21 of the wire 20 in the first electrode 31 and to connect the first end portion 21 of the wire 20 and the first electrode 31. Examples of a heating device include a heater (to be more specific, a heater that is set at lower pressure compared with existing technology and a heater that is set not to apply a pressure) and a solder iron 300. To be specific, for example, the solder iron 300, which is an example of the heating device, is brought into contact with the first end portion 21 of the wire 20 to heat the first end portion 21 of the wire 20. Due to the heating, the flux 40 removes the metal oxide film 311*a* and decomposes the covering portion 202 of the first end portion 21 of the wire 20. Thus, the covering portion 202 of the first end portion 21 of the wire 20 is removed and the metal oxide film 311*a* is removed, so that the first end portion 21 of the wire 20 (the conductive portion 201 in the first end portion 21) is embedded in the first electrode 31.

With the pressure-bonding process, due to the functions of the flux 40 when heated (to be more specific, in addition of the function of the flux 40 in removing the metal oxide film 311*a*, the function of the flux 40 in decomposing and removing the covering portion 202 of the first end portion 21), it is possible to connect the wire 20 and the first electrode 31 (that is, it is possible to perform low-pressure connection) even if the pressing force that presses the first end portion 21 of the wire 20 against the first plating layer 311 is reduced, compared with an existing pressure-bonding process that does not use the flux 40. Thus, the first end portion 21 of the wire 20 can be connected to the first electrode 31 without applying an unnecessarily large pressing force to the core 10, the wire 20, and the first electrode 31. Accordingly, in the pressure-bonding process, it is possible to reduce damage to the coil component 1, to reduce the risk of breakage of the wire 20, and to suppress generation of a crack in the core 10 and the first electrode 31.

The pressure-bonding process can be performed, preferably, without applying a pressing force (that is, no-pressure connection is enabled). When performing the pressure-bonding process without applying a pressing force, for example, if the bottom surface of the core 10 is placed to face upward, the first end portion 21 of the wire 20 sinks into the first plating layer 311 due to the weight of the wire 20.

Because low-pressure connection is enabled in the pressure-bonding process, the first end portion 21 of the wire 20 does not deform and retains the original shape. That is, in a cross section of the wire 20, the sectional shape of the conductive portion 201 in the first end portion 21 of the wire 20 after the pressure-bonding process is substantially the same as the sectional shape of the conductive portion 201 of the wire 20 that is positioned on the winding-core portion 13, and is, to be specific, substantially circular.

Because low-pressure connection is enabled in the pressure-bonding process, at least a part of the first end portion 21 of the wire 20 is embedded in the first electrode 31 and is not in contact with the second plating layer 312. The fact that the first end portion 21 of the wire 20 is not in contact with the second plating layer 312 means that a large pressing force was not applied during the pressure-bonding process and a crack was not generated in the second plating layer 312 due to a pressing force. Such suppression of generation of a crack means that, for example, in a case where the second plating layer 312 is a barrier layer that has resistance to solder leaching, decrease of resistance to solder leaching of the first electrode 31 is suppressed. In contrast, if a crack is generated in the second plating layer in a pressure-bonding process, when mounting the coil component 1, solder may reach the underlying electrode layer through the crack, and it may not be possible to sufficiently suppress solder leaching. The fact that the first end portion 21 of the wire 20 is not in contact with the second plating layer 312 also means that a large pressing force was not applied to the core 10 during the pressure-bonding process. Because the pressure to the core 10 is reduced as described above, it is possible to reduce damage to the core 10 (to be more specific, generation of a crack). Moreover, because low-pressure connection or no-pressure connection is enabled in the pressure-bonding process, a large pressing force is not applied during the pressure-bonding process, and it is possible to reduce the risk of breakage of the wire 20.

With the pressure-bonding process, it is possible to reduce the temperature (heating temperature) to which the wire 20 is heated (that is, it is possible to perform low-temperature connection), compared with an existing pressure-bonding process. Thus, it is possible to connect the first end portion 21 of the wire 20 to the first electrode 31 without applying unnecessary heat to the core 10, the wire 20, and the first electrode 31. The heating temperature is, for example, in the range of 200° C. to 300° C. Thus, with the pressure-bonding process, it is possible to reduce thermal damage to the core 10, the wire 20, and the first and second electrodes 31 and 32.

Because unnecessary heat is not applied in pressure-bonding process, the metal oxide film 311*a* having low wettability is not likely to be formed. Moreover, in the pressure-bonding process, even if the conductive portion 201 becomes exposed from the first plating layer 311, an oxide film having low wettability is not likely to be formed on the surface of the conductive portion 201 that has been exposed. Thus, it is possible to form a strong joint when mounting the coil component 1 on a circuit board. In an existing pressure-bonding process, the covering portion is removed from an end portion of a wire by causing thermal decomposition or the like by heating the covering portion to a temperature that is higher than the highest allowable temperature of a resin (such as polyurethane, polyamide, or polyamide-imide) that is the material of the covering portion. For example, with existing heat-pressure-bonding, it is not possible to remove a covering portion made of polyamide-imide, and such a covering portion is removed by irradiating the covering portion with laser light.

Because low temperature connection and low-pressure connection are enabled compared with an existing technology due to the pressure-bonding process as described above, it is easy to remove the covering portion 202 from the first end portion 21 of the wire 20 and to remove a residue of the material of the covering portion 202 from the inside of the first electrode 31. Thus, because the covering portion 202 having low wettability and the residue thereof can be easily removed from the inside of the first electrode 31, it is possible to strongly join the coil component 1 to a circuit board when mounting the coil component 1.

With the pressure-bonding process, low pressure connection and low temperature connection are enabled as described above. This is because the first plating layer 311 is heat-connected in a state in which the first plating layer 311 is in contact with the flux 40. To be specific, when the flux 40 is heated, an activator included in the flux 40 allows the metal oxide film 311*a* on the surface of the first plating layer 311 (such as a Sn layer) to be easily removed. Thus, the first plating layer 311 becomes easier to melt, and, as a result, the first end portion 21 of the wire 20 is easily embedded.

The flux 40 includes rosin and an activator. Examples of the rosin include a natural rosin and a modified rosin. Examples of the modified rosin include a rosin obtained by reducing a natural rosin (reduced rosin), a rosin obtained by polymerizing a natural rosin (polymerized rosin), a rosin obtained by disproportioning a natural rosin (disproportionate rosin), and a rosin derivative obtained by introducing a substituent in a natural rosin. The rosin may include only one of these rosins or may include a combination of two or more of these rosins.

An activator has a function as a reducer. If the flux 40 includes an activator, during the pressure-bonding process, the flux 40 accelerates a reduction reaction of the metal oxide film 311*a*. Because the activator accelerates removal of the metal oxide film 311*a*, at least a part of the first end portion 21 of the wire 20 can be easily embedded in the first plating layer 311. Examples of the activator include an organic acid such as carboxylic acid, halogenated alcohol, halogenated hydrocarbon, and amine Examples of the carboxylic acid include: a monocarboxylic acid such as formic acid, acetic acid, lauric acid, or palmitic acid; and a dicarboxylic acid such as oxalic acid, malonic acid, succinic acid, glutaric acid, adipic acid, suberic acid, azelaic acid, sebacic acid, or phthalic acid. The activator may include one of these or may include a combination of two or more of these.

The flux 40 may further include a solvent. The solvent allows the viscosity of the flux 40 to be adjusted. Examples of the solvent include alcohol, ketone, ester, ether, aromatic hydrocarbon, and aliphatic hydrocarbon. Examples of the alcohol include polyhydric alcohol such as ethylene glycol. The solvent may include one of these or a combination of two or more of these.

Because the flux 40 is used in the pressure-bonding process, in the coil component 1, carbon (to be more specific, carbon that is considered to derive from the constituents of the flux 40) is present in the first plating layer 311 (to be more specific, in the layer and on the layer surface of the first plating layer 311). Moreover, in the coil component 1, a residue of the flux 40 used when manufacturing the coil component 1 may be present in the first plating layer 311. The residue of the flux 40 is, for example, rosin or a modified rosin in a case where the flux 40 including rosin, a solvent, and an activator is used in the method of manufacturing the coil component 1.

In the above description, the first end portion 21 of the wire 20 is connected to the first electrode 31. By using a similar method, it is possible to connect the second end portion 22 of the wire 20 to the second electrode 32.

Second Embodiment

A second embodiment differs from the first embodiment in that the flux 40 is applied to the first end portion 21 of the wire 20 instead of the surface of the first plating layer 311. To be specific, in the first embodiment, the flux applying step is performed before the wire winding step. In the second embodiment, the flux applying step is performed after the wire winding step. This difference will be described below. In the second embodiment, because reference numerals that are the same as those of the first embodiment represent elements that are the same as those of the first embodiment, description of such elements will be omitted.

A method of manufacturing the coil component 1 according to the second embodiment includes a core preparing step, an outer-electrode forming step, a wire winding step, a flux applying step, a contact step, and a connection step.

In the wire winding step, after winding the wire 20 around the winding-core portion 13, the first end portion 21 is not bent and is not brought into contact with the first electrode 31.

In the flux applying step, the flux 40 is applied to the first end portion 21 of the wire 20. For example, the flux 40 is applied to the first end portion 21 of the wire 20 by dipping the first end portion 21 of the wire in the flux 40 in the container 100 illustrated in FIG. 4A.

In the contact step, the first end portion 21 of the wire 20 and the first plating layer 311 are brought into contact with the flux 40 by bending the first end portion 21 of the wire 20. Thus, the surface of the first plating layer 311 and the first end portion 21 of the wire 20 can be brought into contact with each other, while interposing the flux 40 between the surface of the first plating layer 311 and the first end portion 21 of the wire 20.

In the embodiments described above, the first and second end portions 21 and 22 of the wire 20 are entirely embedded in the first and second electrodes 31 and 32. However, the present disclosure is not limited to this. It is sufficient that at least a part of the first and second end portions 21 and 22 of the wire 20 is embedded in the first and second electrodes 31 and 32.

In the embodiments described above, in a cross section of the wire 20 (section taken along line X-X in FIG. 1), the shape of the conductive portion 201 in the first end portion 21 of the wire 20 is substantially the same as the shape of the conductive portion 201 of the wire 20 that is positioned on the winding-core portion 13. However, the present disclosure is not limited to this. The sectional shape of the conductive portion 201 in the first end portion 21 need not be exactly the same as the sectional shape of the conductive portion 201 on the winding-core portion 13. In the case where the sectional shapes of the conductive portion 201 are the substantially same, the sectional shapes need not be exactly the same, and may be approximately the same.

In the embodiments described above, the configuration of the first electrode 31 has been described. However, the present disclosure is not limited to this. In the coil component 1, the second electrode 32 may have a configuration that is similar to those of the first electrode 31. That is, the second electrode 32 may include the first plating layer 321, a second plating layer 322, and an underlying electrode layer 323. In this case, because the second electrode 32 has a configuration similar to that of the first electrode 31, the second end portion 22 of the wire 20 can be firmly connected to the second electrode 32, and thus the connectivity between the wire 20 and the first and second electrodes 31 and 32 is further improved. However, one of the first and second electrodes 31 and 32 may have the above configurations. If the coil component 1 further includes a third electrode and a fourth electrode, one of the first to fourth electrodes may have the above configuration.

In the embodiments described above, the first and second electrodes 31 and 32 include plating layers that are formed by plating. However, the present disclosure is not limited to this. The electrodes 31 and 32 may include metal layers that are formed by using a method other than plating. That is, the first and second electrodes 31 and 32 include the underlying electrode layers 313 and 323 that are formed on the first and second bottom surfaces 11*a* and 12*a* of the first and second flange portions 11 and 12 and metal layers that are formed on the underlying electrode layers 313 and 323. Examples of the metal layer include a plating layer and a metal layer that is formed by using a method other than plating. When the metal layer is a plating layer, in the first embodiment, the first plating layer corresponds to a first metal layer and the second plating layer corresponds to the second metal layer.

In the embodiments described above, the first electrode 31 includes two plating layers 311 and 312, and the second electrode 32 includes two plating layers 321 and 322. However, the present disclosure is not limited to this. For example, the first and second electrodes 31 and 32 each may include three or more plating layers.

The second plating layers 312 and 322 are not in contact with the first end portions 21 and 22 of the wire 20. However, the present disclosure is not limited to this. For example, the second plating layers 312 and 322 may be in contact with the first end portions 21 and 22 of the wire 20.

In the embodiments described above, the coil component 1 includes one wire 20. However, the present disclosure is not limited to this. If the coil component 1 includes two wires 20, the coil component 1 is capable of functioning as a common mode choke coil. To be specific, if the coil component 1 includes two wires 20, the first flange portion 11 includes two leg portions in parts adjacent to the first bottom surface 11*a*, a first electrode is provided on one of the leg portions, and a third electrode is provided on the other leg portion. The second flange portion 12 includes two leg portions in parts adjacent to the second bottom surface 12*a*, a second electrode is provided on one of the leg portions, and a fourth electrode is provided on the other leg portion. A first end portion of one of the wires (first wire) is connected to the first electrode, and a second end portion of the first wire is connected to the second electrode. A first end portion of the other wire (second wire) is connected to the third electrode, and a second end portion of the second wire is connected to the fourth electrode.

In the embodiments described above, the first and second electrodes 31 and 32 include the underlying electrode layers 313 and 323. However, the present disclosure is not limited to this. The electrodes 31 and 32 may include, for example, a metal terminal made of Cu, instead of at least one of the underlying electrode layers 313 and 323.

In the embodiments described above, the flux 40 is applied to one of the surfaces of the first plating layer 311 and the first end portion 21 of the wire 20. However, the present disclosure is not limited to this. The flux 40 may be brought into contact with both of the surface of the first plating layer 311 and the first end portion 21 of the wire 20, in a state in which the surface of the first plating layer 311 and the first end portion 21 of the wire 20 are in contact with each other The present disclosure is not limited to the first and second embodiments, and may be carried out in various embodiments as long as the spirit and scope of the present disclosure are not changed. The configurations described in the first and second embodiments are non-limiting examples, and may be modified in various ways without substantially departing from the effects of the present disclosure. For example, matters that have been described in the first and second embodiments may be used in any appropriate combinations.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core that includes a winding-core portion and a flange portion that is on an end surface of the winding-core portion;

a wire that is wound around the winding-core portion; and an outer electrode that is on a bottom surface of the flange portion, to which an end portion of the wire is connected, and that includes a first metal layer that defines a surface of the outer electrode, wherein at least a part of the end portion of the wire is embedded in the first metal layer, the wire includes a conductive portion and a covering portion that covers the conductive portion, the covering portion includes polyurethane or polyamide, carbon element is present in the first metal layer, and the carbon element is a part of a resin, and the resin includes rosin or a modified rosin.

2. The coil component according to claim 1, wherein carbon element is present in the first metal layer.

3. The coil component according to claim 1, wherein the wire includes a conductive portion and a covering portion that covers the conductive portion, and in a cross section of the wire, a shape of the conductive portion of the wire in the end portion of the wire is substantially the same as a shape of the conductive portion of the wire that is positioned on the winding-core portion.

4. The coil component according to claim 1, wherein the wire includes a conductive portion and a covering portion that covers the conductive portion, and the conductive portion is exposed from the covering portion in a portion of the end portion of the wire adjacent to the bottom surface of the flange portion.

5. The coil component according to claim 4, wherein an area where the conductive portion is exposed is larger in the portion of the end portion of the wire adjacent to the bottom surface of the flange portion than in a portion of the end portion of the wire adjacent to the surface of the outer electrode.

6. The coil component according to claim 1, wherein the outer electrode further includes a second metal layer that is covered by the first metal layer, and at least a portion of the end portion of the wire is embedded in the first metal layer and is not in contact with the second metal layer.

7. The coil component according to claim 1, wherein the outer electrode further includes a second metal layer that is covered by the first metal layer, and the second metal layer is a barrier layer that has resistance to solder leaching.

8. The coil component according to claim 1, wherein the first metal layer includes tin.

9. The coil component according to claim 2, wherein the wire includes a conductive portion and a covering portion that covers the conductive portion, and in a cross section of the wire, a shape of the conductive portion of the wire in the end portion of the wire is substantially the same as a shape of the conductive portion of the wire that is positioned on the winding-core portion.

10. The coil component according to claim 2, wherein the wire includes a conductive portion and a covering portion that covers the conductive portion, and the conductive portion is exposed from the covering portion in a portion of the end portion of the wire adjacent to the bottom surface of the flange portion.

11. The coil component according to claim 2, wherein the outer electrode further includes a second metal layer that is covered by the first metal layer, and at least a portion of the end portion of the wire is embedded in the first metal layer and is not in contact with the second metal layer.

12. The coil component according to claim 2, wherein the outer electrode further includes a second metal layer that is covered by the first metal layer, and the second metal layer is a barrier layer that has resistance to solder leaching.

13. The coil component according to claim 2, wherein the first metal layer includes tin.

* * * * *